| United States Patent [19] | [11] | 4,384,054 |
|---|---|---|
| Moraw et al. | [45] | May 17, 1983 |

[54] ASBESTOS-FREE FRICTION MATERIAL

[75] Inventors: Klaus Moraw; Hans-Günther Paul, both of Duisburg, Fed. Rep. of Germany

[73] Assignee: Rutgerswerke Aktiengesellschaft, Frankfurt am Main, Fed. Rep. of Germany

[21] Appl. No.: 307,627

[22] Filed: Oct. 1, 1981

[30] Foreign Application Priority Data

Oct. 9, 1980 [DE] Fed. Rep. of Germany ....... 3038129

[51] Int. Cl.³ ............................ C08J 5/14; C09K 3/14
[52] U.S. Cl. ..................................... 523/156; 523/155; 106/36; 260/762
[58] Field of Search ................... 106/36; 523/156, 155

[56] References Cited

U.S. PATENT DOCUMENTS

| 3,896,075 | 7/1975 | Longley | 106/36 |
| 4,130,537 | 12/1978 | Bohrer | 106/36 |
| 4,137,214 | 1/1979 | Sochalski | 106/36 |
| 4,178,278 | 12/1979 | Reynolds | 106/36 |

OTHER PUBLICATIONS

Chem. Abst: 43:3750b, 1949, Korovyakov.

Primary Examiner—Theodore Morris
Attorney, Agent, or Firm—Hammond & Littell, Weissenberger and Muserlian

[57] ABSTRACT

An asbestos-free friction material useful for brake linings, clutches, etc. comprising 5 to 25% by weight of a hardenable binder or binder mixture, a reinforcing fibrous material and conventional fillers, abrasives and lubricants the said reinforcing material consisting essentially of 1 to 50% by weight of diabase fibers with an average fiber length of 100 to 750 μm and 1 to 44% by weight of metal fibers, metal wool or metal in the form of chips, powder or lamella, especially steel.

8 Claims, No Drawings

ASBESTOS-FREE FRICTION MATERIAL

STATE OF THE ART

The present commercial friction materials for clutches and brakes are usually produced with asbestos fibers as a reinforcing material since the linings have high thermal stability and good friction behavoir and attempts are being made to find a suitable replacement for asbestos fibers due to environmental pollution problems and possible carcinogenic problems of asbestos for those working in the brake lining industry and a possible shortage of asbestos raw materials. Reinforcing materials such as fibers with a mineral, ceramic, glass or organic base have been used to replace asbestos in friction linings but they lack the desirable physical properties of asbestos linings. The search for friction materials having substantially superior qualities than the asbestos linings has continued because industrial demands on friction linings have constantly increased with respect to thermal and mechanical strength, wear resistance, braking delay and stability delay with rising drum temperatures and increasing speed.

The selection of certain fibers made it possible to develope friction linings with great improvements in certain properties. DOS 2,727,541 describes using aramide fibers as a reinforcing material in friction lining which are supposedly equivalent to asbestos linings but abrasion of the drum and linings is much lower. However, the delay values, particularly for increasing speed and increasing temperatures is inadequate for the greater demands. U.S. Pat. No. 4,130,537 describes a combination of aramide fibers and glass fibers as a reinforcing material for friction linings with better deceleration values but they also show a delay decrease at high temperatures and lining and drum wear rates are rather high.

OBJECTS OF THE INVENTION

It is an object of the invention to provide an asbestos-free friction material for friction linings having high deceleration values with low drum and lining wear rates, the said deceleration values being substantially constant both at different speeds and different drum temperatures or in several successive brakings.

It is a further object of the invention to provide improved brake linings.

These and other objects and advantages of the invention will become obvious from the following detailed description.

THE INVENTION

The novel asbestos-free friction material of the invention is comprised of 5 to 25% by weight of a hardenable binder or binder mixture, a reinforcing fibrous material and conventional fillers, abrasives and lubricants, the said reinforcing material consisting essentially of 1 to 50% by weight of diabase fibers with an average fiber length of 100 to 750 $\mu$m and 1 to 44% by weight of metal fibers, metal wool or metal in the form of chips powder or lamella.

Friction linings with a mixture of diabase fibers and steel particles as reinforcing material of the invention have certain advantages over conventional asbestos linings as they possess high thermal stability and a high wear resistance which makes them useful for drum and disc brake linings and clutch linings in automobiles, trucks and the railroad area. Tests of brake linings of the invention show 50% less wear than corresponding asbestos linings, both on a inertia dynamometer and in actual wear tests with a mid-size passenger car. Because the diabase fiber has an extremely low content of glass, the wear rate of the opposite drum is one tenth that of asbestos linings and no measurable wear was found in the wear test after 26000 km with a mid-size automobile.

In contrast to linings containing only metal fibers as a reinforcing material, there are no heat conductivity problems with the friction linings of the invention using a combination of metal fibers and diasbase fibers so that the brake fluid is not heated over the maximum tolerated values even under extreme driving conditions.

Diabase is a volcanic rock characterized by particular roughness and strength and this rock can be melted and spun into fibers from the melt whereby the length of the fiber can be varied. Fibers of 100 to 750 $\mu$m length can be used for the friction materials according to the invention, preferably, however, fibers of 150 to 350 $\mu$m length are used. Corresponding fibers are commercially available under the name "spinrock" and these fibers can be present in unoriented form as so-called fiber refuse. However, it is preferred to open up the fiber bond before use by mixing the fiber in a mixer, kneader or chopper.

To increase the wetting capacity of the fibers with the binder, and thus to improve the bond, the fibers can be treated with an impregnating agent before they are used. Suitable impregnating agents are silanes, nitrile- and/or SBR rubber, phenol resins of the novolac- or resol-type, melamine resins or furan resins. The impregnation can be effected so that the fibers are saturated in a solution of the impregnating agent and subsequently dried, or that a corresponding master batch is provided in a mixer or kneader consisting of the fibers and impregnating agents as is customary in the rubber industry.

The novel method of the invention for producing a friction brake lining comprises mixing the diabase fibers and metal fibers, metal wool or pieces of metal with an impregnating agent, admixing the latter with a hardenable binder mixture, placing the resulting mixture in a mold and compressing the mixture to form a brake lining and hardening the same by heating.

Examples of suitable binders are heat-hardenable polymers such as phenolic resins, epoxide resins, furan resins and/or heat and chemical resistant natural and synthetic rubber like nitrile rubber or SBR rubber.

Apart from these principal components, other known fillers, lubricants and abrasives as well as hardening-agents or accelerators for the polymeric binder can be incorporated into the mixture.

In the following example there are described several preferred embodiments to illustrate the invention. However, it is to be understood that the invention is not intended to be limited to the specific embodiments. In the examples, comparisons of the values of the friction material of the invention indicated as samples 1 and 2 are made with sample 3 containing asbestos fibers.

EXAMPLE

The rubber, plasticizer and vulcanizing agent of Table I were mixed in a kneader for 3 minutes and the steel wool was added. The mixtur was mixed for 2 minutes and the remaining ingredients of Table I except the phenolic resin and fibers were added. After mixing for 3 minutes, the phenolic resin and fibers were added to the mixture which was mixed for an additional 3 minutes. The resulting mixture was granulated to a grain size up to 3 mm and the granulate was placed in a mold and compressed at 170° to 190° C. at a pressure of 200 to 300 bar/cm² for 30 seconds per mm of lining thickness. The resulting linings were ground or cut to the desired size and were hardened at 160° to 180° C. for about 3 hours. The linings were tested to determine braking deceleration under different conditions in a inertia dynamometer and the drum and lining wear rates were determined.

TABLE I

| Components - % by weight | Sample 1 | 2 | 3 |
|---|---|---|---|
| Asbestos fiber 5 R | — | — | 41.0 |
| diabase fiber | 12.0 | 22.0 | — |
| steel wool | 28.0 | 18.0 | 8.0 |
| resin (from cashew nutshell oil) | 5.0 | 5.0 | 5.0 |
| Fe$_3$O$_4$ | 4.0 | 4.0 | — |
| MgO | 7.0 | 7.0 | 7.0 |
| talcum | 7.7 | 7.7 | 7.7 |
| Thomas phosphate | 5.0 | 5.0 | — |
| calcium hydroxide | 6.0 | 6.0 | 6.0 |
| plasticizer (hydrocarbon) | 2.3 | 2.3 | 2.3 |
| nitrile rubber | 13.0 | 13.0 | 13.0 |
| sulfur | 0.9 | 0.9 | 0.9 |
| vulcanization accelerator | 0.4 | 0.4 | 0.4 |
| zinc oxide | 0.7 | 0.7 | 0.7 |
| phenol resin | 5.5 | 5.5 | 5.5 |
| graphite | 2.5 | 2.5 | 2.5 |

The deceleration in m/sec² was determined as a function of the hydraulic pressure p at an initial speed of 80 km/h with an initial drum temperature of 60° C. at the beginning of each braking. The results are reported in Table II.

TABLE II

| Pressure (bar) | deceleration in m/sec² Sample | | |
|---|---|---|---|
| | 1 | 2 | 3 |
| 20 | 1.90 | 2.0 | 1.9 |
| 50 | 3.85 | 4.35 | 4.05 |
| 80 | 5.80 | 6.60 | 6.35 |

The deceleration in m/sec² was determined as a function of the hydraulic pressure p at an initial speed of 80 km/h with an initial drum temperature of 240° C. at the beginning of each braking. The results are reported in Table III.

TABLE III

| Pressure in bar | deceleration in m/sec² | | |
|---|---|---|---|
| | 1 | 2 | 3 |
| 20 | 1.85 | 1.95 | 1.05 |
| 50 | 3.90 | 4.45 | 2.50 |
| 80 | 5.70 | 7.00 | 5.05 |

The deceleration in m/sec² was determined as a function of the speed V at a constant hydraulic pressure of 60 bar and an initial drum temperature of 60° C. at the beginning of the test. The results are reported in Table IV.

TABLE IV

| V in km/h | deceleration in m/sec² | | |
|---|---|---|---|
| | 1 | 2 | 3 |
| 40 | 4.70 | 5.40 | 5.40 |
| 80 | 4.35 | 4.95 | 4.75 |
| 120 | 4.40 | 4.95 | 4.35 |
| 140 | 4.55 | 4.85 | 4.25 |

The deceleration in m/sec² was determined as a function of the temperature T with an initial speed of 30 km/h and a pressure of 20 bar. The results are reported in Table V.

TABLE V

| Temperature °C. | Delay in m/sec² | | |
|---|---|---|---|
| | 1 | 2 | 3 |
| 20 | 2.15 | 2.15 | 1.70 |
| 80 | 2.10 | 2.20 | 1.60 |
| 140 | 2.20 | 2.20 | 1.60 |
| 260 | 2.35 | 2.15 | 1.20 |

After the completion of the said tests, the brake linings and brake drums were measured and weighed. The tests were repeated again and the wear rate was determined as an arithmetic average of the two tests. The results are reported in Table VI.

TABLE VI

| | 1 | 2 | 3 |
|---|---|---|---|
| lining wear in g | 0.35 | 0.4 | 1.22 |
| drum wear in g | 0.1 | 0.1 | 1.2 |

The test resutls show that the linings 1 and 2 of the invention are superior to sample 3.

Various modifications of the linings of the invention may be made without departing from the spirit or scope thereof and it is to be understood that the invention is intended to be limited only as defined in the appended claims.

What we claim is:

1. An asbestos-free friction material comprising 5 to 25% by weight of a hardenable binder or binder mixture, a reinforcing fibrous material and conventional fillers, abrasives and lubricants, the said reinforcing material consisting essentially of 1 to 50% by weight of diabase fibers with an average fiber length of 100 to 750 μm and 1 to 44% by weight of metal fibers, metal wool or metal lamella, chips or pieces.

2. The material of claim 1 wherein the diabase fiber length is 150 to 350 micrometers.

3. The material of claim 1 or 2 wherein the diabase fibers are used in the form of fiber refuse.

4. The material of claim 3 wherein the reinforcing fibers are treated with an impregnating agent.

5. The material of claim 4 wherein the impregnating agent is selected from the group consisting of silanes, epoxides, nitrile rubbers, SBR rubber, phenolic resins and furan resins.

6. A method of preparing a friction brake lining comprising mixing aramide fibers metal fibers with an impregnating agent, admixing the latter with a hardenable binder mixture in the ratios of claim 1, placing the resulting mixture in a mold and compressing the mixture to form a brake lining and hardening the same by heating.

7. A friction brake lining produced by the process of claim 6.

8. The material of claim 1 wherein the metal is steel.

* * * * *